United States Patent
Le et al.

(10) Patent No.: US 8,942,193 B2
(45) Date of Patent: Jan. 27, 2015

(54) ROUTING DIFFERENT SUBSETS OF AN INTERNET PROTOCOL FLOW OVER DIFFERENT POINTS OF ATTACHMENT

(75) Inventors: Khiem Le, Coppell, TX (US); Wei Wu, Santa Clara, CA (US); Stefano Faccin, Hayward, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 289 days.

(21) Appl. No.: 13/083,034

(22) Filed: Apr. 8, 2011

(65) Prior Publication Data

US 2012/0257566 A1  Oct. 11, 2012

(51) Int. Cl.
*H04W 60/00* (2009.01)
*H04L 12/725* (2013.01)
*H04L 12/721* (2013.01)
*H04W 48/00* (2009.01)
*H04W 80/04* (2009.01)

(52) U.S. Cl.
CPC ........... *H04W 60/005* (2013.01); *H04L 45/308* (2013.01); *H04L 45/38* (2013.01); *H04W 48/17* (2013.01); *H04W 80/04* (2013.01)
USPC ...................................................... 370/329

(58) Field of Classification Search
CPC . H04W 80/04; H04W 60/005; H04W 80/045; H04W 88/06
See application file for complete search history.

(56) References Cited

U.S. PATENT DOCUMENTS

| | | | |
|---|---|---|---|
| 6,947,401 B2 | 9/2005 | El-Malki et al. | |
| 7,602,747 B2 | 10/2009 | Maksymczuk et al. | |
| 2001/0046223 A1* | 11/2001 | Malki et al. | 370/338 |
| 2004/0213181 A1* | 10/2004 | Grech et al. | 370/331 |
| 2006/0193295 A1* | 8/2006 | White et al. | 370/336 |
| 2006/0262732 A1* | 11/2006 | Joutsenvirta et al. | 370/254 |
| 2007/0025292 A1* | 2/2007 | Maksymczuk et al. | 370/331 |
| 2008/0019330 A1* | 1/2008 | Hirano et al. | 370/338 |
| 2008/0225806 A1 | 9/2008 | Arian et al. | |
| 2010/0238864 A1* | 9/2010 | Hirano et al. | 370/328 |
| 2010/0238874 A1* | 9/2010 | Haddad et al. | 370/329 |
| 2011/0103260 A1* | 5/2011 | Jeyatharan et al. | 370/254 |
| 2011/0116450 A1* | 5/2011 | Hirano et al. | 370/328 |
| 2011/0286395 A1* | 11/2011 | Liebsch et al. | 370/328 |
| 2012/0093169 A1* | 4/2012 | Stenfelt et al. | 370/401 |
| 2012/0188949 A1* | 7/2012 | Salkintzis et al. | 370/329 |

FOREIGN PATENT DOCUMENTS

WO    WO 2010091715    * 8/2010

OTHER PUBLICATIONS

Tsirtsis, G. "Flow Bindings in Mobile IPv6 and Network Mobility (NEMO) Basic Support". RFC 6089, Jan. 2011.*

Johnson et al., Network Working Group, Request for Comments: 3775—Mobility Support in IPv6, Jun. 2004 (165 pages).

(Continued)

*Primary Examiner* — Chirag Shah
*Assistant Examiner* — Jenkey Van
(74) *Attorney, Agent, or Firm* — Hanley, Flight and Zimmerman, LLC (57) ABSTRACT

An IP flow is received by an Internet Protocol (IP) mobility anchor point, where the IP mobility anchor point is to anchor traffic of a mobile node. The IP mobility anchor point routes different subsets of the packets of the IP flow to corresponding different points of attachment of the mobile node.

22 Claims, 5 Drawing Sheets (56) References Cited

OTHER PUBLICATIONS

H. Soliman, Network Working Group, Request for Comments: 5555—Mobile IPv6 Support for Dual Stack Hosts and Routers, Jun. 2009 (41 pages).
Wakikawa et al., Network Working Group, Request for Comments: 5648—Multiple Care-of Addresses Registration, Oct. 2009 (36 pages).
Tsirtsis et al., Internet Engineering Task Force (IETF) Request for Comments: 6089, ISSN: 2070-1721—Flow Bindings in Mobile IPv6 and Network Mobility (NEMO) Basic Support, Jan. 2011 (31 pages).
H. Soliman et al., Network Working Group, Request for Comments: 5380—Hierarchical Mobile IPv6 (HMIPv6) Mobility Management, Oct. 2008 (25 pages).
3rd Generation Partnership Project, 3GPP TS 23.261 V10.1.0 (Sep. 2010) (22 pages).
3rd Generation Partnership Project, 3GPP TS 23.402 V8.9.0 (Jun. 2010) (199 page).
3rd Generation Partnership Project, 3GPP TS 23.402 V9.7.0 (Dec. 2010) (200 pages).
3rd Generation Partnership Project, 3GPP TS 24.302 V8.7.0 (Sep. 2010) (51 pages).
3rd Generation Partnership Project, 3GPP TS 24.302 V9.4.0 (Sep. 2010) (54 pages).
3rd Generation Partnership Project, 3GPP TS 24.303 V8.7.0 (Sep. 2010) (30 pages).
3rd Generation Partnership Project, 3GPP TS 24.303 V9.3.0 (Sep. 2010) (31 pages).
3rd Generation Partnership Project, 3GPP TS 24.303 V10.1.0 (Dec. 2010) (49 pages).
Chen et al., "Secure, QoS-Enabled Mobility Support in All-IP Networks," TKN Technical Report TKN-04-013, Berlin, Jun. 2003 (119 pages).
Patent Cooperation Treaty, "International Search Report," issued by the International Searching Authority in connection with PCT application No. PCT/US2012/032157, mailed Jul. 10, 2012 (2 pages).
Patent Cooperation Treaty, "Written Opinion of the International Searching Authority," issued by the International Searching Authority in connection with PCT/US2012/032157, mailed Jul. 10, 2012 (7 pages).
Patent Cooperation Treaty, "International Preliminary Report on Patentability," issued by the International Searching Authority in connection with PCT application No. PCT/US2012/032157, on Oct. 17, 2013 (9 pages).

* cited by examiner

ROUTING DIFFERENT SUBSETS OF AN INTERNET PROTOCOL FLOW OVER DIFFERENT POINTS OF ATTACHMENT

BACKGROUND

Mobile nodes can roam across different access networks to provide mobility to users. Depending on the location of a mobile node, the mobile node is considered to be attached to either the home network of the mobile node or to a visited network. To support mobility of the mobile node, Mobile Internet Protocol (Mobile IP) can be employed, where Mobile IP allows for location-independent routing of packets to the mobile node. Mobile IP defines a home agent in the home network of the mobile node. When the mobile node is away from its home network and in a visited network, the home agent routes packets (targeted to the home address of the mobile node) to the mobile node.

BRIEF DESCRIPTION OF THE DRAWINGS

Some embodiments are described with respect to the following figures.

DETAILED DESCRIPTION

Network Arrangement and Operation

Figure 1:
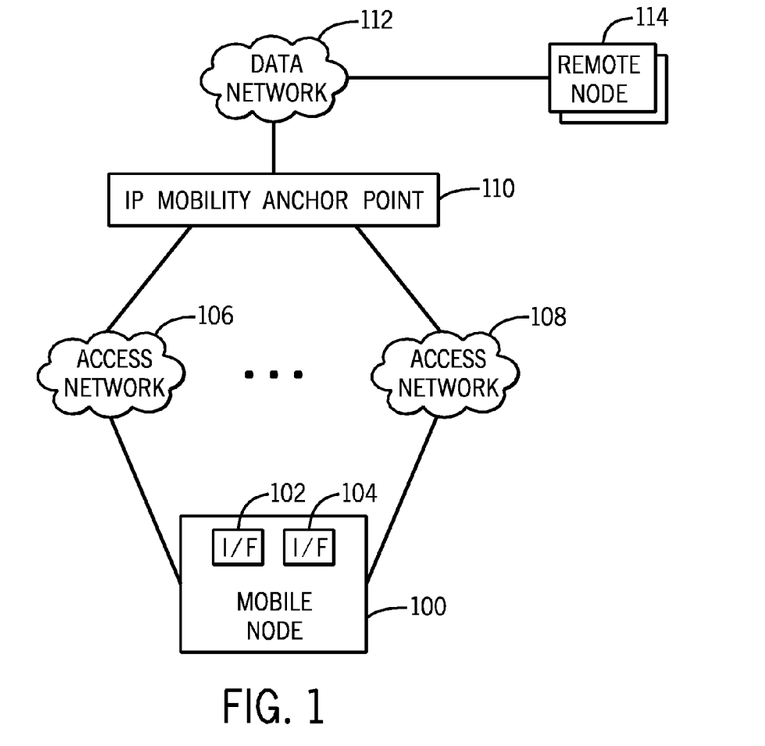
FIG. 1 is a block diagram of an example arrangement including a mobile node and an Internet Protocol (IP) mobility anchor point that incorporate some embodiments.

FIG. 1 illustrates an example arrangement that incorporates techniques or mechanisms according to some embodiments. A mobile node (MN) 100 (also referred to as "user equipment") has multiple interfaces 102 and 104 to allow the mobile node 100 to be attached to respective different types of access networks 106 and 108. Examples of the mobile node 100 include a computer (e.g. notebook computer, tablet computer, etc.), a personal digital assistant (PDA), a mobile telephone, and so forth. Although just two access networks 106 and 108 (and correspondingly two different interfaces 102 and 104) are shown in FIG. 1, it is noted that in alternative examples, the mobile node 100 can be attached to more than two types of access networks. When the mobile node 100 is within a coverage area of a respective access network, the mobile node can attach to that access network. In some cases, the coverage areas of two or more access networks can overlap, in which case the mobile node 100 is able to simultaneously attach to the two or more access networks in the area of overlap. Although just one mobile node 100 is depicted, it is noted that a network can include multiple mobile nodes.

Generally, a mobile node has one or more points of attachment to network resources to allow the mobile node to access the network resources to allow for communication with other nodes. In some examples, different points of attachment can refer to attachment of the mobile node to corresponding different access networks. Alternatively or additionally, different points of attachment of the mobile node can be associated with different addresses, such as a home address and/or care-of-address(es). Different points of attachment can alternatively refer to respective attachments using different types of access technologies.

The different types of access networks 106 and 108 can include networks according to access technologies selected from the following (as examples): LTE (Long Term Evolution) technology provided by the Third Generation Partnership Project (3GPP); UMTS (Universal Mobile Telecommunications System) technology provided by 3GPP; EDGE (Enhanced Data Rates for GSM Evolution) provided by 3GPP; WLAN (wireless local area network) technology defined by IEEE (Institute of Electrical and Electronics Engineers) 802.11; WiFi technology provided by the Wi-Fi Alliance; WiMAX (Worldwide Interoperability for Microwave Access) technology defined by the IEEE 802.16 standards; and/or other types of access technologies.

To support mobility of the mobile node 100 across multiple access networks, various nodes of the example arrangement depicted in FIG. 1 support Mobile Internet Protocol (Mobile IP), in some implementations. With Mobile IP, the mobile node 100 is identified by its home address (HoA). While away from its home network, the mobile node is associated with a care-of-address (CoA), which is an address used by the home agent (or some other node) to forward packets to the mobile node 100 while the mobile node 100 is away from its home network and in a visited network.

Mobile IP specifies how a mobile node registers with its home agent and how the home agent routes packets to the mobile node through the tunnel. Using Mobile IP, mobile nodes may change their point-of-attachment to a network without changing their home IP address. This allows the mobile nodes to maintain transport and higher-layer connections while roaming.

A home agent stores information about mobile nodes whose home address is in the home agent's network. A remote node wanting to communicate with the mobile node uses the home address of the mobile node as the destination address to send packets to. Because the home address logically belongs to the network associated with the home agent, normal IP routing mechanisms forward these packets to the home agent. If the target mobile node is in a visited network, instead of forwarding the packets to a destination that is physically in the same network as the home agent, the home agent redirects these packets towards a foreign agent through an IP tunnel by encapsulating each packet with a new IP header using the care-of-address of the mobile node. The foreign agent then routes the packets to the mobile node that is in the visited network.

When acting as transmitter, a mobile node may send packets directly to the remote node without sending the packets through the home agent, using its care-of-address as the source address for the IP packets, or alternatively, the mobile node can send the packets by tunneling the packets to the home agent, which in turn forwards them to the communicating node.

"Mobile IP" can refer to any one of or combinations of various Mobile IP standards, including standards or proposals that provide extensions to the base Mobile IP standard. For example, Mobile IP can refer to Mobile IPv6 (MIPv6), as presently described by Request for Comments (RFC) 3775, entitled "Mobility Support in IPv6," dated June 2004. An extension of Mobile IPv6 is Dual-Stack MIPv6, as presently described by RFC 5555, entitled "Mobile IPv6 Support for Dual Stack Hosts and Routers, dated June 2009. Dual-stack MIPv6 allows mobile nodes to be assigned and use both IPv6 and IPv4 addresses. Another extension of Mobile IPv6 is provided by Hierarchical Mobile IPv6, as presently described by RFC 5380, entitled "Hierarchical Mobile IPv6 (HMIPv6) Mobility Management," dated October 2008. Yet another extension of Mobile IPv6 is described in RFC 6089, entitled "Flow Bindings in Mobile IPv6 and Network Mobility (NEMO) Basic Support," dated January 2011. RFC 6089 updates RFC 5648, entitled "Multiple Care-of Addresses Registration," dated October 2009, which extends Mobile IPv6 to enable multiple bindings for a given home address.

As shown in FIG. 1, an Internet Protocol (IP) mobility anchor point (IP MAP) 110 is provided. The IP mobility anchor point 110 refers to a router located in a network visited by a mobile node or the home network of the mobile node, where the IP mobility anchor point is used to anchor the IP traffic of the mobile node for IP mobility.

In some example contexts, the IP mobility anchor point 110 is a home agent located in a home network of the mobile node 100. In other example contexts, the IP mobility anchor point 110 is a router located in a visited network. In one example, one of the access networks 106 and 108 can be part of the home network of the mobile node 100, while the other of the access networks 106 and 108 is part of a visited network. In another example, both access networks 106 and 108 can be part of visited networks of the mobile node 100.

Although reference is made to the IP mobility anchor point 110 in various implementations discussed herein, it is noted that, more generally, the IP mobility anchor point 110 depicted in FIG. 1 can be replaced with a mobility correspondent node (MCN). An MCN is an entity that can act in any one of the following roles: (1) a mobility agent as described in RFC 6089, referenced above; or (2) a home agent as described in RFC 3775, referenced above; or (3) a correspondent node as described in RFC 3775, or (4) an anchor point as described in RFC 5380, referenced above, or (5) an IP mobility anchor point as discussed above. Thus, although the ensuing discussion refers to techniques or mechanisms provided with an IP mobility anchor point, similar techniques or mechanisms can be employed with any other type of MCN.

As further shown in FIG. 1, the IP mobility anchor point 110 is connected to a data network 112 (e.g. Internet or other type of data network) to allow for communication with a remote node 114 (or multiple remote nodes). The mobile node 100 may have established a session (or multiple sessions) with one or more remote nodes 114, in which IP traffic is exchanged between the mobile node 100 and the one or more remote nodes 114. IP traffic sent by the remote node(s) 114 and destined to the mobile node 100 is routed to the IP mobility anchor point 110, which in turn routes the IP traffic to the mobile node 100 over one or more of the access networks 106, 108 to which the mobile node 100 is attached.

Note that FIG. 1 is intended to show a general arrangement of nodes in which techniques or mechanisms according to some implementations can be employed. In other examples, more specific arrangements can be used, in which additional nodes not shown in FIG. 1 would be present.

As discussed in further detail below, in accordance with some embodiments, the IP mobility anchor point 110 is able to selectively route different subsets of packets of an IP flow (on the downlink from the IP mobility anchor point 110 to the mobile node 100) to corresponding different points of attachment of the mobile node 100. Stated differently, the IP mobility anchor point 110 distributes packets of an IP flow across multiple points of attachment of the mobile node 100 by selecting which route to use. In the context of FIG. 1, the different points of attachment include respective access networks 106 and 108. Upon receiving an IP flow of packets destined to the mobile node 100 (which is assumed to be attached to both the access networks 106 and 108), the IP mobility anchor point 110 can distribute the packets of the IP flow across the access networks 106 and 108 to the mobile node 100. Thus, for example, a first subset of the IP flow can be provided over the access network 106 to the mobile node 100, while a second subset of the IP flow is provided over the access network 108 to the mobile node 100. The ability to route the different subsets of packets in an IP flow across different points of attachment can be associated with various benefits, which are described further below.

Note also that the mobile node 100 in some cases can also distribute packets of an IP flow across its different points of attachment, for packets sent on the uplink from the mobile node 100 to the IP mobility anchor point 110.

An "IP flow" refers to a set (e.g. sequence) of packets matching a traffic selector. A traffic selector is a filter containing one or more parameters that can be matched against the content of an IP packet to classify the IP packet. In some implementations, the filter contains one or more of: a source IP address; a destination IP address; a transport protocol type or number; a source port number; a destination port number; a quality of service (QoS) indicator; other fields in an IP protocol header or TCP (Transmission Control Protocol) or UDP (User Datagram Protocol) protocol header; and fields, identifiers, descriptors, or values (or any combination of the fields, identifiers, descriptors, or values) related to higher layer protocols or applications (or both). The concept of the traffic selector allows for the IP mobility anchor point 110 to classify incoming IP packets at a finer level of granularity than classification based just on an IP destination address.

Figure 2:
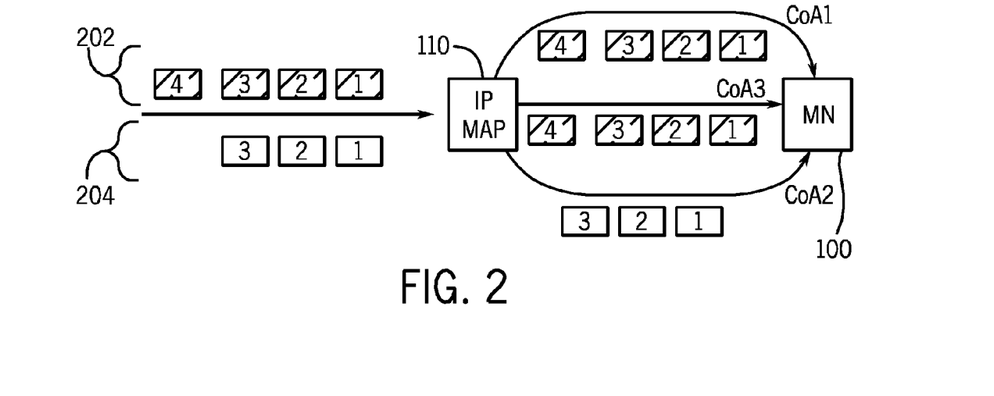
FIG. 2 illustrates routing of packets of IP flows according to an example.

FIG. 2 illustrates routing of IP flows 202 and 204 by the IP mobility anchor point 110 in one example. In the example of FIG. 2, multiple bindings have been defined for a given home address of the mobile node 100. Each binding is a logical association or mapping between the home address of a mobile node and an IP address of the mobile node (e.g., a care-of-address for when the mobile node is not attached to an access network of the home network, or the home address for when the mobile node is attached to an access network of the home network) that allows the IP mobility anchor point 110 to identify which IP address (e.g., the care-of-address or the home address) the IP mobility anchor point should forward the packets destined to the home address of the mobile node.

Each binding is identified by a binding identifier (BID). Thus, if there are multiple bindings defined for the home address of the mobile node 100, then the home address is bound to multiple IP addresses. An example of multiple bindings and respective IP addresses is set forth below:

| HoA | BID | MN IP Address |
| --- | --- | --- |
| HoA = X | BID1 | CoA1 |
| HoA = X | BID2 | CoA2 |
| HoA = X | BID3 | CoA3 |

Although each of the bindings above associates the home address (X) with a respective care-of-address, it is noted that there can be another binding for the situation where the mobile node is attached to its home network—in this case, the binding would specify an association of the home address (X) with a destination IP address that is the home address of the mobile node.

The IP mobility anchor point 110 can also store information relating to flow bindings to control the routing of multiple IP flows. Note that a "flow binding" is different from the "binding" discussed above. A "flow binding" includes a traffic selector and an associated action. IP packets that match the traffic selector of the flow binding are processed according to the respective action. In the example of FIG. 2, an IP flow 202 matches a first flow binding in the IP mobility anchor point 110, while the IP flow 204 matches a second flow binding in the IP mobility anchor point 110. The IP mobility anchor point applies different actions to the IP flow 202 and IP flow 204, according to the respective first and second flow bindings.

In the example of FIG. 2, the action performed by the IP mobility anchor point 110 for the IP flow 202 (according to the first flow binding) is to route the packets of the IP flow 202 by duplicating the packets and sending a first copy to care-of-addresses CoA1 of the mobile node 100 and a second copy to CoA3 of the mobile node 100. Note that all packets (1-4) of the IP flow 202 are duplicated to each of CoA1 and CoA3. Although reference is made to care-of-addresses in this discussion, the mobile node 100 can be considered to have multiple points of attachment, and these points of attachment can be used by the IP mobility anchor point 110 to forward packets to the mobile node 100.

In the example of FIG. 2, the packets of the IP flow 204 that match the traffic selector of the second flow binding are processed according to a second action, in this case routing of the packets of the IP flow 204 to care-of-address CoA2 of the mobile node 100.

According to the example of FIG. 2, the first and second flow bindings are set forth below in the following two respective flow binding entries:

| FID-PRI (Flow ID priority) | FID (Flow ID) | Traffic selector | BID | Status (active or inactive) |
|---|---|---|---|---|
| 10 | FID1 | Dest IP addr = A, Protocol = UDP | BID1, BID3 | Active |
| 20 | FID2 | Src IP addr = Y | BID2 | Active |

In the mapping data structure above, each flow binding entry has a flow ID priority (to indicate a relative priority of the respective flow ID), a flow ID (to identify a respective IP flow), a traffic selector, BID(s), and a status (which can be active or inactive). All packets that match the traffic selector of the first flow binding entry above (having destination IP address=A and being according to the UDP protocol) are replicated and forwarded according to BID1 and BID3, which correspond to care-of-addresses CoA1 and CoA3, respectively. Any packet that does not match the traffic selector of the first flow binding entry but that matches a traffic selector of the second flow binding entry (source IP address=Y) is forwarded according to BID2 (corresponding to care-of-address CoA2).

Note that any flow binding entry having a status of "inactive" does not affect traffic (in other words, packets are not matched against the traffic selectors of inactive flow binding entries).

Any remaining packets that do not match any of the flow binding entries above are simply forwarded to the care-of-address indicated by the highest order BID, such as according to the table below. In this example, such packets will be forwarded to BID1 corresponding to care-of address CoA1.

| BID-PRI | BID | MN IP Address |
|---|---|---|
| 20 | BID1 | CoA1 |
| 30 | BID3 | CoA2 |
| 30 | BID2 | CoA3 |

As depicted in the example of FIG. 2, when a flow binding entry specifies an action that causes forwarding of packets of an IP flow to multiple bindings (multiple corresponding care-of-addresses), all packets of the IP flow are duplicated across the multiple bindings. In other words, the IP mobility anchor point 110 routes a copy of each of the IP packets (of a given IP flow) addressed to the home address of the mobile node to each of the IP addresses in the respective bindings (which for the first flow binding entry above are BID1 and BID3). It can be inefficient to systematically send a copy of all packets of an IP flow across multiple points of attachment (such as different access networks). In some cases, the access networks can be wireless access networks with relatively limited bandwidth.

For improved performance, it may be desirable to allow packets of a given IP flow to be distributed across different points of attachment of the mobile node (such as distributed across multiple access networks when the mobile node is simultaneously attached to the multiple access network). As noted above, distributing packets of a single IP flow refers to sending a first subset of the packets of the IP flow to a first point of attachment, and sending a second, different subset of the packets of the IP flow to a second, different point of attachment. Note that distributing also contemplates the case where one of the first and second subsets (or the entire IP flow or any portion thereof) is duplicated to another point of attachment—in this scenario, a first subset of the IP flow is forwarded across a first point of attachment, a second subset of the IP flow is forwarded across a second point of attachment, and all of the packets of the IP flow (or some portion of the IP flow that may duplicate packets of the first and second subsets) are forwarded across a third point of attachment.

A benefit of distributing packets of one IP flow to different points of attachment is that the bandwidth available to the mobile node can be increased to allow higher throughput. Additionally, allowing selection of a path to be used for delivering an IP packet on a per-packet basis can provide for path diversity, which can result in higher reliability for certain IP traffic, such as unacknowledged IP traffic (e.g., UDP traffic). Note that "on a per-packet basis" does not mean that the decision is necessarily made for each packet, but that once a decision is made on how to route packets, the decision is applied to each packet separately. The ability to distribute packets of an IP flow across different points of attachment (which can be associated with different paths) allows for less dropped packets due to path disruption that can occur on one or more access networks, such as due to sporadic and bursty radio interference. For example, if the mobile node is connected to two different types of radio access networks, interference may impact one of the two radio access networks. Thus, although one of the radio access networks may drop packets of the mobile node, the other radio access network can continue to route the packets of the mobile node.

Figure 3:
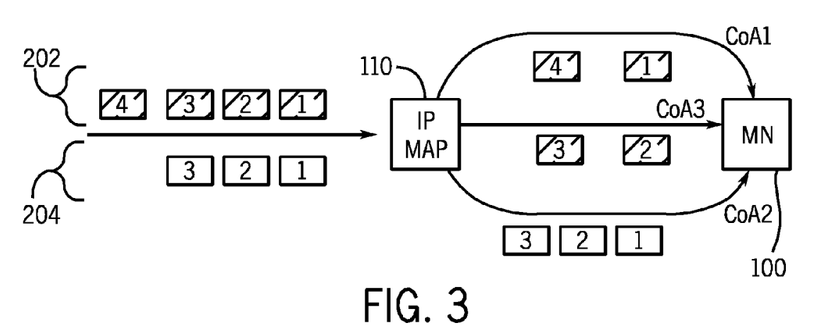
FIG. 3 illustrates routing of packets of IP flows according to some embodiments.

In accordance with some embodiments, as shown in FIG. 3, the IP mobility anchor point 110 is able to distribute the packets of the IP flow 202 across multiple points of attachment of the mobile node 100, which in the example of FIG. 3 correspond to care-of-addresses CoA1 and CoA3. In the example of FIG. 3, packets 1 and 4 of the IP flow 202 are routed to CoA1, while packets 2 and 3 of IP flow 202 are routed to CoA3. More generally, the IP mobility anchor point 110 according to some embodiments is able to selectively route packets to multiple points of attachment, which can correspond to respective multiple destination IP addresses (e.g., a care-of-address or home address of the mobile node), without having to systematically send a copy of all packets of an IP flow to each of the multiple destination IP addresses. The selection of the destination IP address to which to route the packets of the IP flow can be performed on a per-packet basis.

In accordance with some implementations, the concept of "dynamic connection" is introduced at the IP mobility anchor point 110. Packets belonging to an IP flow and matching a traffic selector are mapped to a dynamic connection, instead of a set of destination IP addresses associated with a static routing rule (such as a rule that specifies that all packets of an IP flow are systematically copied to each of the destination IP addresses in the set). The dynamic connection includes one or more destination IP addresses associated with an IP flow and is identified by a descriptor containing one or more destination addresses. A dynamic connection corresponds to an extended binding, as discussed further below.

The mobile node 100 dynamically adds destination IP addresses to or removes destination IP addresses from the dynamic connection by exchanging signaling with the IP mobility anchor point 110. For any given packet, the routing logic of the IP mobility anchor point 110 determines to which destination IP addresses of a dynamic connection the given packet is to be routed. Based on the determination of the routing logic, the IP mobility anchor point 110 routes some packets destined to the home address of the mobile node 100 to first destination IP address(es) corresponding to the dynamic connection, while the IP mobility anchor point 110 routes other packets may be routed to different destination IP address(es) corresponding to the dynamic connection. The routing logic can also decide to duplicate some packets and route those duplicated packets to more than one destination IP address corresponding to the dynamic connection, by as an example routing each duplicated packet to a different destination IP address.

The routing logic can employ various criteria to decide how packets of an IP flow are to be routed to destination addresses of a dynamic connection. In some examples, the routing logic in the IP mobility anchor 110 can evaluate the congestion level over different paths and decide which path(s) is (are) preferable. In other examples, the routing logic can evaluate the cost (interpreted as an example in terms of monetary cost) of each of the paths. In further examples, the routing logic can decide based on policies configured in the IP mobility anchor point 110 which path is (are) preferable. Note that the routing logic is implementation-specific, and can differ for different operators. Also, note that instead of evaluating various criteria as noted above at the IP mobility anchor point 110, the evaluation can instead be performed by another entity, with a result of the evaluation provided to the routing logic. In this discussion, it is assumed for simplicity that the routing logic resides at the IP mobility anchor; however, generally, the routing logic may reside inside or outside the IP mobility anchor. If the routing logic is outside the IP mobility anchor, then the routing logic can provide its routing decisions to the IP mobility anchor for execution by the IP mobility anchor.

In accordance with some embodiments, to allow for the creation of dynamic connections, signaling can be exchanged between the mobile node 100 and the IP mobility anchor point 110 to create respective extended bindings. An extended binding is a binding between an IP flow and one or more IP addresses as in the case of a regular binding (in the ensuing discussion, reference to "regular binding" refers to a non-extended binding). However, with an extended binding, the IP mobility anchor point 110 does not have to send a copy of each packet of a given IP flow to all IP addresses in the extended binding; instead, the mobility anchor point 110 can employ its routing logic to decide how packets of an IP flow are to be selectively routed to the multiple IP addresses in the extended binding.

Moreover, in some embodiments, a mechanism can be provided to limit the rate at which the mobile node 100 can send signaling to modify extended bindings (where modifying extended bindings includes creating extended bindings, adding or removing destination IP addresses to/from extended bindings, or changing extended bindings or flow bindings).

Various benefits can be provided by some embodiments. Benefits of multi-path communication (each path can correspond to a different point of attachment) can be realized. Also, a solution according to some embodiments provides resilience to bursty data loss in mobile applications. For example, if any path disruption occurs (e.g. sporadic and bursty radio interference) that causes some IP packets to be dropped, if packets are distributed over different points of attachment (e.g. a first packet or block of packets on a first point of attachment, a second packet on a point of attachment, a third packet on a third point of attachment, and so forth), then unless the interference impacts all points of attachment, the number of packets lost can be considerably reduced and the impact on the application is lowered.

Actions on the IP flows are defined at a finer granularity than conventionally done. When multiple points of attachment are available, techniques or mechanisms according to some embodiments does not mandate the forwarding of a copy of all packets of an IP flow to each point of attachment, which improves efficiency in system resource usage.

Also, advanced forwarding rules can be used at the level of each dynamic connection, based on one or more criteria, to select one or more points of attachment for routing packets. For example, traffic load can be balanced across the multiple paths (corresponding to the multiple points of attachment) by selecting at any given time the least congested path. Another example is when the goal is to maximize the throughput. In that case, all the paths are used in parallel to transmit the packets.

Management of the dynamic connections (creation, deletion, addition/removal of addresses in extended bindings) can be performed by extensions of the existing Mobile IP schemes—in alternative embodiments, such management can also be performed using other techniques.

Mapping Data Structures

Based on signaling between the mobile node 100 and the IP mobility anchor point 110, the IP mobility anchor point 110 creates various mapping data structures in order to determine or select the routing of IP packets of an IP flow on the downlink from the IP mobility anchor point 110 to the mobile node 100. In some embodiments, the mobile node 100 establishes similar mapping data structures in the mobile node 100 by copying or mirroring the mapping data structures created in the IP mobility anchor point 110 in the mapping data structures created in the mobile node 100. In some examples, the mobile node 100 creates the mirrored mappings data structures in the mobile node 100 for certain types of traffic which involve substantial amounts of both uplink and downlink traffic. In other examples, where IP traffic is predominantly in the downlink (from the IP mobility anchor point 110 to the mobile node 100), the mirrored mapping data structures may not be provided in the mobile node 100.

In some embodiments, if the mobile node 100 contains mirrored mapping data structures, when the mobile node 100 needs to send packets in the uplink (from the mobile node 100 to the IP mobility anchor point 110), the mobile node 100 uses the mirrored mapping data structures (and possibly additional local information) to select which access network or access technology (more generally which point of attachment) is to be used for routing the packets in the uplink by looking up the content of the data structure and selecting a route.

Figure 4:
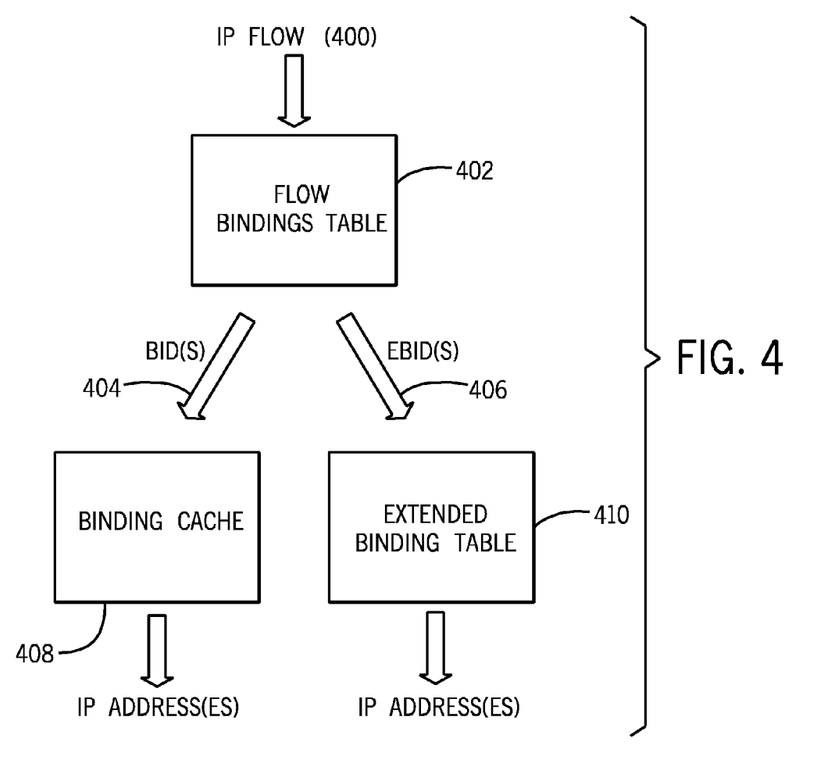
FIG. 4 illustrates mapping data structures used according to some embodiments.

FIG. 4 illustrates various mapping data structures that can be employed in accordance with some embodiments. The mapping data structures include a flow bindings table 402, a binding cache 408, and an extended bindings table 410. Packets of an input IP flow (400) are matched to the entries of the flow bindings table 402 to determine whether a corresponding flow binding entry is associated with the IP flow.

If a flow binding entry exists for the IP flow 400, then the IP flow is mapped to one or more of BID(s) and EBID(s). The mapping of the IP flow to BID(s) is represented by arrow 404, while the mapping of the IP flow to EBID(s) is represented by arrow 406. Note that an IP flow can be mapped to both BID(s) and EBID(s) in some examples. Mapping of the IP flow to BID(s) (as represented by arrow 404) causes access of the binding cache 408 that contains definitions of bindings. On the other hand, mapping of an IP flow to EBID(s) (as indicated by arrow 406) causes access of the extended bindings table 410.

As depicted in FIG. 4, the output of each of the binding cache 408 and the extended bindings table 410 includes one or multiple IP addresses that correspond to the input IP flow (400).

Although reference is made to a "flow bindings table," "binding cache" and "extended bindings table," note that in other implementations, other types of mapping data structures can be used to store information relating to respective flow bindings, bindings, or extended bindings, respectively.

The flow bindings table 402 is a conceptual data structure that contains a respective entry for each of the flow bindings. The flow bindings table 402 includes various flow binding entries, where each flow binding entry associates a respective IP flow with at least one of a BID (or multiple BIDs) and EBID (or multiple EBIDs). In some examples, each flow binding entry can include the following parameters:

Flow identifier (FID) (to identify an IP flow),
Traffic selector,
Zero, one or more BID(s),
Active/inactive flag. In accordance with some embodiments, the semantics of this parameter are extended to include EBID. A valid BID or EBID is required to make the entry 'Active', i.e., the Active/inactive flag is set if the flow binding entry has an associated valid BID or EBID. Note that an entry becomes 'Inactive' only if all of the BIDs and all of the EBIDs of the corresponding flow binding entry are deregistered/deleted. If only some of the BIDs/EBIDs are still valid, the invalid BIDs/EBIDs are simply ignored.
FID-PRI: priority, used to break a tie between overlapping flow bindings (in the case where packets of an IP flow match multiple flow bindings, the flow binding associated with the higher priority is used),
EBID-present flag (to indicate whether an EBID is present in the corresponding entry),
Zero, one or more EBID(s).

In accordance with some embodiments, the flow bindings table 402 is extended to allow inclusion of additional information that is not defined by presently existing standards or proposals, such as RFC 6089. The flow bindings table 402 has been extended to add the EBID-present flag (which can have a first value to indicate that one or more EBIDs are present in the respective flow bindings table entry, and a second value to indicate that no EBID is present in the flow binding entry). The flow bindings table 402 is also extended to include EBID(s), as well as to specify that the Active/inactive flag is set based on whether the respective entry has any valid BID or EBID.

The binding cache 408 is a conceptual data structure used to identify the Mobile IP state maintained by the mobile node and IP mobility anchor point. Each entry of the binding cache 408 includes the mobile node's home address, one or more destination IP addresses (e.g. home address or care-of-addresses), along with the corresponding BID. Effectively, each entry of the binding cache 408 corresponds to a binding identified by a respective BID, and the entry maps a home address to a respective destination address (e.g. care-of-address or home address).

The binding cache 408 includes the IP addresses which may be part of a dynamic connection. For example, if an extended binding corresponds to IP addresses IP1, IP2 and IP3, the three addresses IP1, IP2 and IP3 would also appear in the binding cache 408.

The conceptual data structure of the flow bindings table 402 for the purpose of flow bindings can be thought of as a conceptual list of entries that is separate from the binding cache 408. However, as both the binding cache 408 and flow bindings table 402 are conceptual data structures, the actual format is implementation specific. Examples of different formats of binding caches are set forth below. In other examples, other formats can be used.

| Home Address | MN IP Address | Binding ID | Priority |
| --- | --- | --- | --- |
| HoA1 | CoA1 | BID1 | x |
| HoA1 | CoA2 | BID2 | y |
| ... | ... | ... | ... |

| Home Address | Routing Address | Binding ID | BID Priority | Flow ID | FID Priority | Routing Filter |
| --- | --- | --- | --- | --- | --- | --- |
| HoA1 | CoA1 | BID1 | x | FID1 | a | Description of IP flows... |
|  |  |  |  | FID2 | b | Description of IP flows... |
| HoA1 | CoA2 | BID2 | y | FID3 | ... | ... |

The extended bindings table 410 is a conceptual data structure having multiple entries, where each entry corresponds to a respective extended binding as identified by an EBID. Each entry of the extended bindings table 410 maps a home address to respective multiple destination IP addresses.

The extended bindings table 410 defines which destination addresses belong to an extended binding. In the example extended bindings table 410 below, EBID3 corresponds to addresses IP5 and IP6, while EBID4 corresponds to addresses IP8, IP10, IP12. Each entry of an example extended bindings table set forth below contains a home address (X), a corresponding EBID, and the IP address of the mobile node (to which packets are to be routed) corresponding to the home address and EBID.

| HoA | EBID | MN IP Address |
|---|---|---|
| HoA = X | EBID3 | IP5, IP6 |
| HoA = X | EBID4 | IP8, IP10, IP12 |

The following illustrates an example ordered flow bindings table for a mobile node that has registered multiple bindings, two of which are extended bindings.

| FID-PRI | FID | Traffic Selector | BID | A/I | EBID-present | EBID |
|---|---|---|---|---|---|---|
| 10 | FID4 | TCP | BID2 | Active | False | — |
| 30 | FID2 | Src-addr = IPy | — | Inactive | True | EBID4 |
| 40 | FID5 | UDP | BID1 | Active | True | EBID3 |

According to the above flow binding entries, all TCP traffic will match the first entry, and will be forwarded to BID2. The second entry of the example flow bindings table is marked as Inactive. Inactive entries do not affect traffic, i.e., packets are not matched against inactive entries.

Any UDP traffic that does not match any of the earlier entries of the flow bindings table will match the third entry—the third entry specifies that such UDP traffic is to be replicated and forwarded to addresses associated with both BID1 and EBID3.

Figure 5:
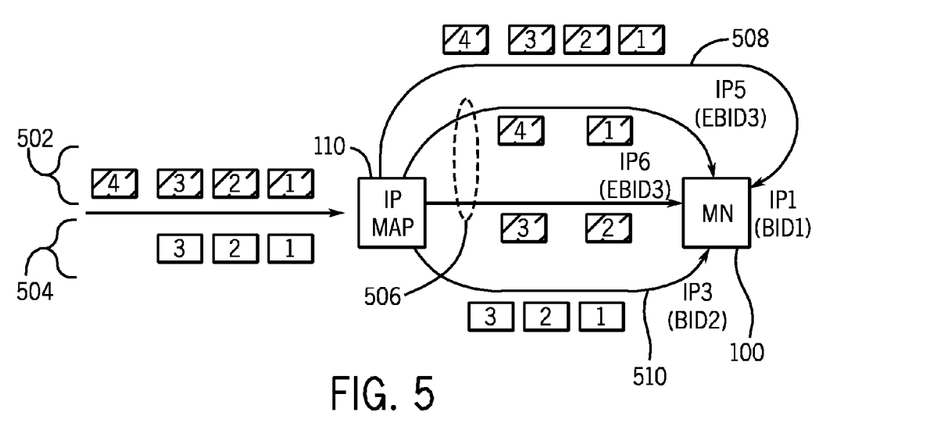
FIG. 5 illustrates routing of packets of IP flows according to further embodiments.

Assuming that the binding cache 408 has the content below, then the routing of IP flows 502 and 504 is as shown in FIG. 5.

| HoA | BID | MN IP Address |
|---|---|---|
| HoA = X | BID1 | IP1 |
| HoA = X | BID2 | IP3 |
| HoA = X | BID6 | IP5 |
| HoA = X | BID7 | IP6 |

Assuming that IP flow 502 includes UDP packets matched to the third entry of the flow bindings table above (containing flow ID 5), then the packets of the IP flow 502 are routed as follows: (1) distribute (506) the packets of IP flow 502 across the IP addresses of EBID3, which are IP5 and IP6 according to the example extended bindings table above, and (2) replicate all packets of the IP flow 502 and route (508) to the IP address of BID1 (which is IP1 according to the example binding cache above).

Assuming that IP flow 504 includes TCP packets matched to the first entry of the flow bindings table above (containing flow ID 4), then the packets of the IP flow 504 are routed (510) to the address of BID2, which is IP3 according to the example binding cache above.

Any remaining packets that do not match any of the entries of the flow bindings table will be simply forwarded to the IP address indicated by the highest order BID in the example table below. In the example, such packets will be forwarded to BID1 corresponding to care-of address IP1.

| (E)BID-PRI | BID/EBID | MN IP Address |
|---|---|---|
| 20 | BID1 | IP1 |
| 30 | EBID3 | IP5, IP6 |
| 30 | BID2 | IP3 |
| 40 | BID6 | IP5 |
| 40 | BID7 | IP6 |

Signaling and MN/Map Functionality

Figure 6:
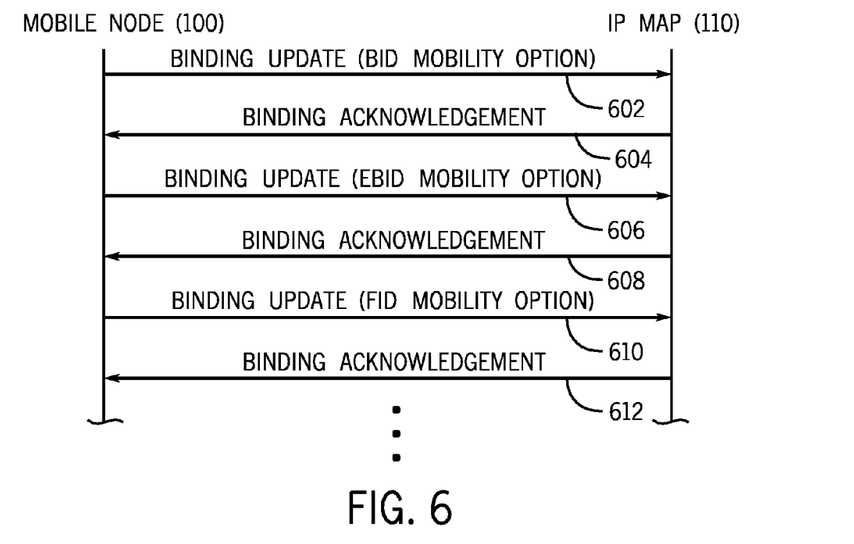
FIG. 6 is a message flow diagram illustrating exchanges of signaling according to some embodiments.

FIG. 6 is a message flow diagram illustrating signaling according to some embodiments exchanged between the mobile node 100 and an IP mobility anchor point 110. In some implementations, the signaling exchanged between the mobile node 100 and the IP mobility anchor point 110 can include a Binding Update message, as defined by RFC 3775, and as extended by RFC 6089, in accordance with some implementations. In other implementations, other forms of signaling can be employed. Note that the Binding Update message used according to some embodiments further includes various options to support extended bindings, which are not present in existing standards or proposals.

In the example of FIG. 6, three Binding Update messages are sent (at 602, 606, and 610) from the mobile node 100 to the IP mobility anchor point 110. The Binding Update message sent at 602 includes a Binding Identifier mobility option to create a regular binding, as identified by a respective BID. The Binding Update message sent at 606 includes an Extended Binding Identifier mobility option to create an extended binding, as identified by a respective EBID. The Binding Update message sent at 610 includes a Flow Identification mobility option to create a flow binding.

The Binding Update messages (602, 606, 610) are acknowledged by respective Binding Acknowledgment messages (sent at 604, 608, and 610, respectively).

In alternative examples, instead of sending three Binding Update messages as depicted in FIG. 6, a smaller number of Binding Update messages can be sent by including multiple ones of the mobility options mentioned above in one Binding Update message. For example, a Binding Update message can include both a Binding Identifier mobility option and an Extended Binding Identifier mobility option. In such example, the Binding Update messages 602, 606 are effectively combined into one Binding Update message.

As another example, a Binding Update message can include a Binding Identifier mobility option, an Extended Binding Identifier mobility option, and a Flow Identifier mobility option. In this latter example, one Binding Update message can be sent instead of the three Binding Update messages of FIG. 6.

The Binding Identifier mobility option is used to define the mapping of a binding identified by a binding identifier (BID) to an IPv4 or IPv6 address to which packets destined to the mobile node are to be routed.

The Flow Identification mobility option contains information that allows the receiver of a Binding Update message to install policies regarding or related to an IP flow and route the IP flow to a corresponding address. Installing a policy regarding or related to an IP flow includes creating a new entry in a data structure related to the IP flow, or modifying an existing entry. This option can be included in the Binding Update message, as well as in a Binding Acknowledgment message that is responsive to the Binding Update message. Multiple options may exist within the same Binding Update message. In accordance with some embodiments, the Flow Identification mobility option is extended to support extended bindings (that are not provided in present standards or proposals). In some examples, the fields of the Flow Identification mobility option are set forth below:

Option type: numeric value to be assigned,
Option len: length of the option,
Flow Identifier (FID): identifier of an IP flow,
FID-PRI: priority used to break ties when different flow descriptions in different options overlap,
Status: indicates success or failure of the flow binding operation for the particular flow in the option (in accordance with some embodiments, a new value is added for "EBID not found"),
Various sub-options (optional)—(two sub-options are listed below, with the remaining sub-options not listed for brevity):
  Binding Reference: format unchanged, but semantics extended to support extended bindings with details provided below,
  Traffic Selector.

The Binding Reference of sub-option note above in the Flow Identification mobility option has the following format:
Sub-opt type: value to specify a type of the sub-option,
Sub-opt len: value to specify a length of the sub-option,
One or more identifiers of BIDs or EBIDs or both.

In addition to the Binding Identifier mobility option and Flow Identification mobility option noted above, an Extended Binding Identifier mobility option can also be included in the Binding Update message (such as the Binding Update message sent at 606 in FIG. 6). The Extended Binding Identifier mobility option is used to define the mapping of an extended binding identified by an extended binding identifier (EBID) to one or more bindings identified by BIDs.

In some examples, the Extended Binding Identifier mobility option can have the following fields:
Type="Install EBID",
Length: length of the option,
Extended Binding Identifier (EBID): identifier of extended binding,
H: flag to indicate that the mobile node registers multiple bindings to the home agent,
Status: status indication, extended with additional status of "Undefined BID",
EBID-PRI: priority of the extended binding,
One or more BIDs: Lists the BIDs corresponding to the addresses currently in the set of the extended binding.

In accordance with some embodiments, a "Binding Rate Limit" mobility option can also be included in a Binding Acknowledgment message. This option is used by the IP mobility anchor point 110 to limit the rate at which the mobile node 100 can modify an extended binding (as discussed above).

In some examples, the Binding Rate Limit mobility option can have the following fields:
Type="Binding Rate Limit",
Length: length of the option,
Status: field to indicate whether the binding rate limit is exceeded. This field is only relevant when included in the Binding Acknowledgement message and is to be ignored in the Binding Update message.
Max-Bindings: maximum number of bindings allowed during the Time Period,
Time Period: time period during which the number of extended binding updates is not to exceed Max_Bindings.

In some examples, a Binding Acknowledgment message containing the Binding Rate Limit mobility option can be sent in response to a Binding Update message that creates or otherwise modifies an extended binding.

In response to the Binding Update message at 606 (which contains the Extended Binding Identifier mobility option), the IP mobility anchor point 110 creates at the IP mobility anchor point 110 a mapping of an extended binding identified by an extended binding identifier (EBID) to one or more existing bindings identified by BIDs. Note that the mobile node 100 should not send a Binding Update message that includes an Extended Binding Identifier mobility option corresponding to a given home address if the mobile node 100 had not previously sent a Binding Update (BU) message carrying a Binding Identifier mobility option corresponding to the given home address.

Note, however, that the mobile node 100 can send a Binding Update message including both Binding Identifier and Extended Binding Identifier mobility options.

Moreover, note that the mobile node 100 should send a Binding Update message carrying Binding Identifier/Extended Binding Identifier mobility options before any Binding Update message that carries a Flow Identification mobility option. Alternatively, a Binding Update message can be sent that carries the Binding Identifier and Extended Binding Identifier mobility options along with the Flow Identification mobility option.

To delete an extended binding, the Binding Update message is sent with the Overwrite (O) flag in the Binding Update message set. The Overwrite (O) flag is described in RFC 5648, referenced above, in some examples. To add an extended binding, the Overwrite (O) flag in the Binding Update message is not set.

The following describes operations of the IP mobility anchor point 110 in response to Binding Update messages from the mobile node 100. In response to a Binding Update message containing both the Binding Update mobility option and the Extended Binding mobility option corresponding to a given home address, the IP mobility anchor point 110 processes the Binding Identifier mobility option first (before processing the Extended Binding Identifier mobility option).

In response to receiving a Binding Update message carrying a Binding Identifier mobility option, an Extended Binding Identifier mobility option, and a Flow Identification mobility option, the IP mobility anchor point 110 processes the Binding Identifier mobility option and the Extended Binding Identifier mobility option first (before processing the Flow Identification mobility option).

In response to receiving a Binding Update message containing an Extended Binding Identifier mobility option and with the Overwrite (O) flag unset, the IP mobility anchor point 110 adds the specified extended binding(s). However, if the Overwrite (O) flag is set, the IP mobility anchor point 110 deletes the specified extended binding(s).

Upon the reception of a Binding Update message, the IP mobility anchor point 110 responds with a Binding Acknowledgment message. The status code in the Binding Acknowledgement does not give information on the success or failure of flow bindings. In order to inform the mobile node about the status of the flow binding(s) requested by a mobile node, a Flow Identification mobility option should be included in the Binding Acknowledgement message. Specifically, the IP mobility anchor point 110 should copy each Flow Identification mobility option received in the Binding Update and set the status code of the copied Flow Identification mobility option to an appropriate value.

As noted above, normally, an extended binding has to be established before an IP flow can be mapped to the extended binding. If there is signaling from the mobile node 100 to the IP mobility anchor point 110 attempting to map a flow binding to an extended binding that does not exist, the IP mobility anchor point 110 sets the "EBID not found" indication in the Flow Identification mobility option in the Binding Acknowledgment message.

Throttling

As mentioned above, throttling of mobile node modifications of dynamic connections can be provided. It is possible for a mis-configured or faulty mobile node to send too much signaling to modify extended bindings, thus creating excessive signaling overhead. It may be beneficial to have a solution wherein the network can limit the number of modifications to extended bindings that the mobile node can perform.

In some embodiments, the IP mobility anchor point 110 includes in a Binding Acknowledgment message a Binding Rate Limit mobility option discussed above. The Binding Acknowledgment message is sent by the IP mobility anchor point 110 to the mobile node 100 in response to a Binding Update message from the mobile node 100. The Binding Rate Limit mobility option contains an indication (set by the IP mobility anchor point 110) of a predefined maximum number of Binding Updates allowed for a given amount of time (Time Period).

The IP mobility anchor point 110 can send a new Binding Rate Limit mobility option that overrides values of Binding Rate Limit mobility options sent in previous Binding Acknowledgment messages.

When the mobile node 100 receives a Binding Rate Limit mobility option, the mobile node 100 starts a MN_BU_Max_Num timer and sets the timer to expire after the predefined time interval defined by Time Period in the Binding Rate Limit mobility option. Note that the limit on Binding Updates set in the Binding Rate Limit mobility option does not apply to Binding Updates that do not contain any extended binding (e.g. to address the scenario where the mobile node 100 loses coverage over a given access, and the mobile node 100 has already reached the maximum number of Binding Updates for the time period (Time Period), but the mobile node 100 has to send a Binding Update to remove a care-of-address corresponding to the access that was lost).

The mobile node 100 cannot send more Binding Update messages containing extended bindings to the IP mobility anchor point 110 than allowed by the Max-Bindings value, until the MN_BU_Max_Num timer expires.

When sending a Binding Acknowledgment message containing the Binding Rate Limit mobility option, the IP mobility anchor point 110 stores the value of Max-Bindings and starts a MCN_BU_Max_Num timer corresponding to the mobile node 100. The MCN_BU_Max_Num timer is set to expire after Time Period contained in the Rate Limit mobility option. If the IP mobility anchor point 110 receives a Binding Update message with an extended binding option that causes the total number of Binding Update messages within Time Period to exceed the allowed number of Binding Updates defined by the value Max-Binding before the timer MCN_BU_Max_Num corresponding to the mobile node 100 has expired, the IP mobility anchor point 110 rejects the received Binding Update, in some implementations. The IP mobility anchor point 110 can reject a Binding Update message by setting the status code in the responsive Binding Acknowledgement message to some predefined value, such as a value indicating that the Binding Update is administratively prohibited. In other implementations, the IP mobility anchor point 110 can reject a Binding Update message by setting a new status code in the Binding Rate Limit mobility option to indicate "Binding Rate Limit Exceeded". In such implementations, when the IP mobility anchor point 110 sends a Binding Acknowledgement message in response to a Binding Update, the IP mobility anchor point 110 includes a Binding Rate Limit mobility option to update the mobile node 100.

In another example, it is assumed that the IP mobility anchor point 110 has rejected a first Binding Update message that exceeded the allowed number of Binding Updates defined by the value Max-Binding before the timer MCN_BU_Max_Num corresponding to the mobile node 100 has expired. If the IP mobility anchor point later receives a further Binding Update message before the timer MCN_BU_Max_Num timer corresponding to the mobile node 100 has expired, the IP mobility anchor point 110 may ignore the further Binding Update message.

Alternative Arrangements

Techniques or mechanisms according to some embodiments can be employed in various different arrangements. FIG. 1 depicts a general arrangement that is applicable to various different types of systems.

Figure 7:
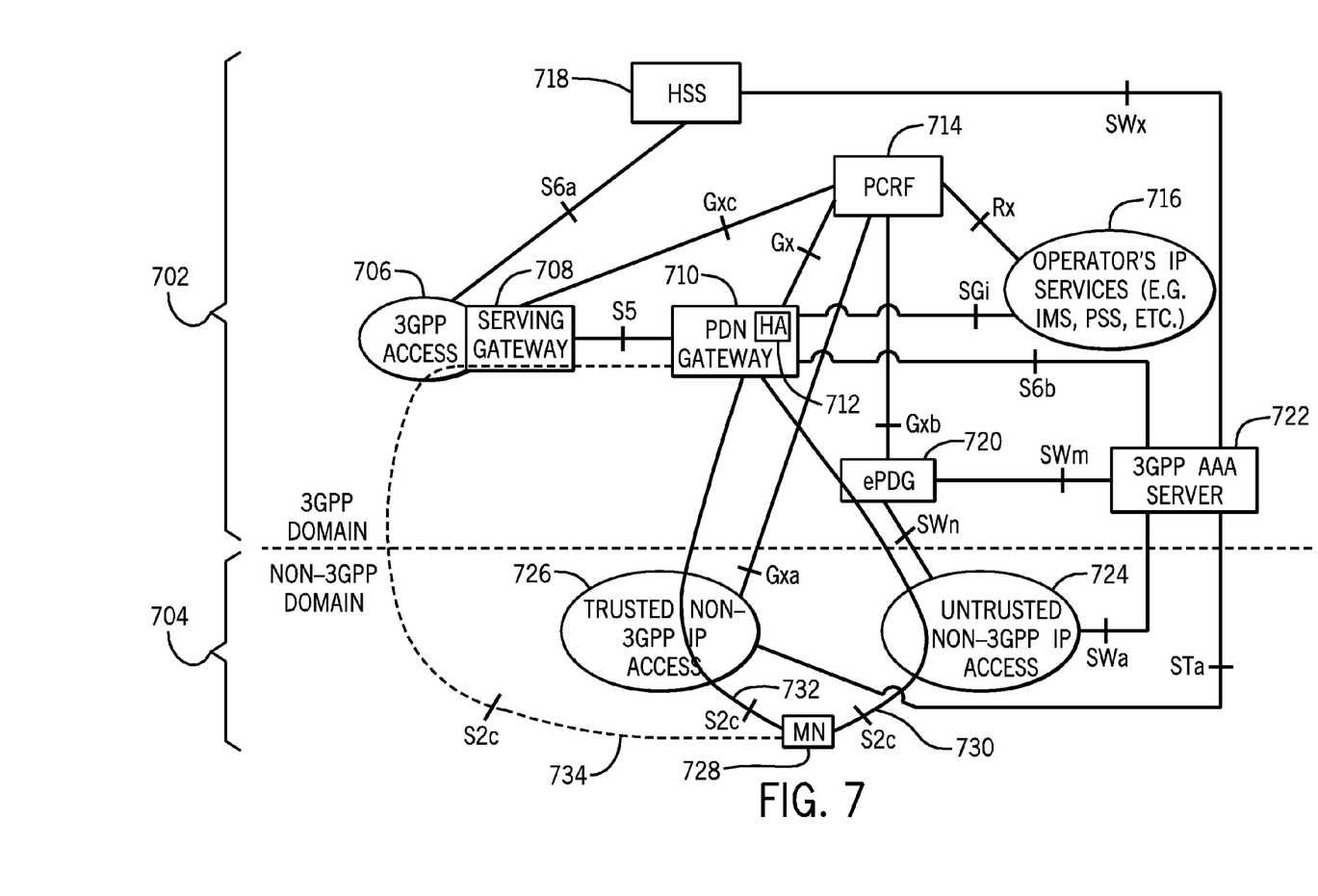
FIG. 7 is a block diagram of another example arrangement incorporating some embodiments.

FIG. 7 shows a more specific arrangement that includes a 3GPP domain 702 and a non-3GPP domain 704. A "3GPP domain" refers to a domain having components that operate according to any of various 3GPP standards. For example, one 3GPP standard is the LTE standard. The 3GPP domain 702 includes a 3GPP access network 706 to which mobile nodes within the coverage area of the 3GPP system 702 can attach.

The 3GPP access network 706 is connected to a serving gateway 708 that routes and forwards data to a PDN (packet data network) gateway 710. The serving gateway 708 manages mobility of a mobile station within the 3GPP domain 702. The PDN gateway 710 is the user plane anchor for mobility between 3GPP access and non-3GPP access. As depicted, the PDN gateway 710 includes a home agent 712, which is one type of IP mobility anchor point discussed above.

The 3GPP domain 702 also includes various other functions, including a PCRF (policy and charging rules function) 714, which defines charging rules for provision of services 716 (supported by the 3GPP domain 702) on behalf of mobile nodes. Another function in the 3GPP domain 702 is a home subscriber server (HSS) 718, which is a database containing subscription-related information (subscriber profiles).

The 3GPP domain 702 also includes an evolved packet data gateway (ePDG) 720 that is responsible for interworking between a core network of the 3GPP domain 702 and an untrusted non-3GPP access network 724, which is in the non-3GPP domain 704. The 3GPP domain 702 also includes an AAA server 722 to perform authentication, authorization, and accounting services. The AAA server 722 is accessible by the ePDG 720.

In addition to the untrusted non-3GPP access network 724, the non-3GPP domain 704 also includes a trusted non-3GPP access network 726. A mobile node 728 is depicted as being attached (by points of attachment 730, 732, and 734) to respective ones of the untrusted non-3GPP access network 724, trusted non-3GPP access network 726, and 3GPP access network 706. The 3GPP standards support multi-access where different heterogeneous access networks (e.g. 706, 726, 724) can be connected to the core network of the 3GPP domain 702.

The various techniques or mechanisms described above can be applied to the mobile node 728 and the home agent 712 to support extended bindings and dynamic connections according to some embodiments. In accordance with some embodiments, using an extended binding, packets of an IP flow between the home agent 712 (that is part of the PDN gateway 710) and the mobile node 728 can be selectively distributed over different points of attachment (730, 732, and 734).

Figure 8:
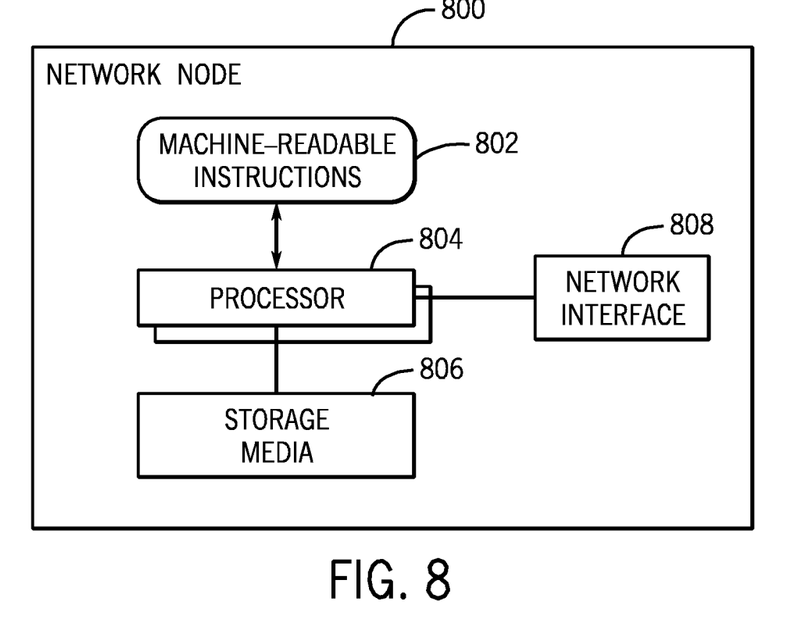
FIG. 8 is a block diagram of a network node incorporating some embodiments.

FIG. 8 illustrates an example network node 800, which can be a mobile node (e.g. mobile node 100 in FIG. 1 or 728 in FIG. 7). Alternatively, the network node 800 can be the IP mobility anchor point 110 of FIG. 1 or home agent 712 of FIG. 7, or any other MCN.

The network node 800 includes machine-readable instructions 802 executable on one or multiple processors 804. The machine-readable instructions 802 are able to implement the various functionalities discussed above involving extended bindings. The processor(s) 804 is (are) connected to a storage media 806 to store data and instructions, and a network interface 808 to communicate with another network node.

A processor can include a microprocessor, microcontroller, processor module or subsystem, programmable integrated circuit, programmable gate array, or another control or computing device.

The storage media 806 is implemented as one or more computer-readable or machine-readable storage media. The storage media includes different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving an Internet Protocol (IP) flow of packets at an IP mobility anchor point, wherein the IP mobility anchor point is configured to route traffic of a mobile node;
   receiving, at the IP mobility anchor point, signaling to create an extended binding, the extended binding to facilitate routing different subsets of the packets of the IP flow to access networks in simultaneous attachment with the mobile node;
   storing a mapping data structure at the IP mobility anchor point, the mapping data structure to store the extended binding;
   for a duration of time, limiting a number of binding updates for the extended binding based on a threshold; and
   routing the different subsets of the packets of the IP flow from the IP mobility anchor point to respective ones of the access networks based on the extended binding.

2. The method of claim 1, wherein the routing further comprises routing copies of packets of at least a particular one of the subsets to another access network in simultaneous attachment with the mobile node.

3. The method of claim 1, further comprising storing a second mapping data structure, wherein the second mapping data structure contains an indicator to indicate whether the extended binding is present in the mapping data structure.

4. The method of claim 1, wherein the IP mobility anchor point is a router in a visited network.

5. The method of claim 1, wherein a first one of the respective access networks is a cellular network and a second one of the respective access networks is a wireless local area network.

6. A method of a first node, comprising:
   communicating, with a second node, an information element relating to an extended binding, the first node is one of a mobile node or an Internet Protocol (IP) mobility anchor point, the second node is the other of the mobile node and the IP mobility anchor point, and the IP mobility anchor point is to route traffic of the mobile node,
   wherein the extended binding defines an association between an IP flow and plural access networks in simultaneous attachment with the mobile node, and wherein the extended binding is to cause the IP mobility anchor point to route different subsets of packets of the IP flow over respective ones of the access networks;
   providing an extended binding to a mapping data structure at the IP mobility anchor point, the extended binding to facilitate routing different subsets of the packets of the IP flow to the access networks; and
   for a duration of time, limiting a number of binding updates for the extended binding based on a threshold.

7. The method of claim 6, further comprising providing the threshold in a Binding Acknowledgement message.

8. The method of claim 6, wherein the information element is communicated in a Binding Update message.

9. The method of claim 6, further comprising:
   storing a second mapping data structure that maps the IP flow to the extended binding.

10. The method of claim 6, wherein the access networks are of different network types.

11. An Internet Protocol (IP) mobility anchor point, comprising:
    an interface to receive an IP flow of packets; and
    at least one processor configured to:
    receive signaling to create an extended binding, the extended binding to facilitate routing different subsets of the packets of the IP flow to access networks in simultaneous attachment with a mobile node;
    store the extended binding in a mapping data structure at the IP mobility anchor point, the extended binding to map the IP flow to the plural access networks;
    according to the extended binding, route the different subsets of the packets of the IP flow to respective ones of the access networks; and
    for a duration of time, limit a number of binding updates for the extended binding based on a threshold.

12. The IP mobility anchor point of claim 11, wherein the at least one processor is configured to store a second mapping data structure, wherein the second mapping data structure contains an indicator to indicate whether the extended binding is present in the mapping data structure.

13. The IP mobility anchor point of claim 11, wherein the at least one processor is configured to receive a Binding Update message to create the extended binding.

14. The IP mobility anchor point of claim 11, wherein the at least one processor is configured to provide the threshold in a Binding Acknowledgment message.

15. The IP mobility anchor point of claim 14, wherein the at least one processor is configured to further:

upon sending the Binding Acknowledgment message, start a timer that is set to expire after the duration of time.

16. The IP mobility anchor point of claim 15, wherein the at least one processor is configured to further:

in response to receiving a Binding Update message to modify an extended binding relating to the mobile node, determine if a total number of Binding Update messages from the mobile node has exceeded the threshold.

17. The IP mobility anchor point of claim 16, wherein the at least one processor is configured to further:

in response to determining that the total number of Binding Update messages has exceeded the predefined threshold and the timer has not yet expired, send an indication to reject the further Binding Update message.

18. The IP mobility anchor point of claim 11, wherein the access networks are of different network types.

19. A mobile node comprising:

an interface to communicate with an Internet Protocol (IP) mobility anchor point; and at least one processor configured to:

send signaling to the IP mobility anchor point containing an information element relating to an extended binding, wherein the extended binding defines an association between an IP flow and plural access networks in simultaneous attachment with the mobile node, where the IP flow is associated with the mobile node;

provide the extended binding to store in a mapping data structure at the IP mobility anchor point, the extended binding to cause the IP mobility anchor point to route different subsets of packets of the IP flow over respective ones of the access networks; and for a duration of time, limit a number of binding updates for the extended binding based on a threshold.

20. The mobile node of claim 19, wherein the signaling comprises a Binding Update message that contains the information element.

21. The mobile node of claim 19, wherein the at least one processor is configured to further receive responsive signaling from the IP mobility anchor point that contains the threshold.

22. The mobile node of claim 19, wherein the access networks are of different network types.

* * * * *